United States Patent
Wu et al.

(10) Patent No.: US 12,124,250 B2
(45) Date of Patent: Oct. 22, 2024

(54) DELIVERY CONTROL METHOD, DELIVERY CONTROL DEVICE AND DELIVERY DEVICE

(71) Applicants: QINGDAO HAIGAO DESIGN & MANUFACTURING CO., LTD., Shandong (CN); HAIER SMART HOME CO., LTD., Shandong (CN)

(72) Inventors: Jian Wu, Shandong (CN); Shu Zhou, Shandong (CN); Zuowei Yi, Shandong (CN); Zhaojun Fei, Shandong (CN); Zhiqun Feng, Shandong (CN)

(73) Assignees: QINGDAO HAIGAO DESIGN & MANUFACTURING CO., LTD., Qingdao (CN); HAIER SMART HOME CO., LTD., Qingdao (CN)

( * ) Notice: Subject to any disclaimer, the term of this patent is extended or adjusted under 35 U.S.C. 154(b) by 664 days.

(21) Appl. No.: 17/311,748

(22) PCT Filed: Nov. 5, 2020

(86) PCT No.: PCT/CN2020/126876
§ 371 (c)(1),
(2) Date: Jun. 8, 2021

(87) PCT Pub. No.: WO2021/135636
PCT Pub. Date: Jul. 8, 2021

(65) Prior Publication Data
US 2022/0326698 A1    Oct. 13, 2022

(30) Foreign Application Priority Data
Dec. 31, 2019   (CN) .......................... 201911410507.3

(51) Int. Cl.
G05B 19/418    (2006.01)
G05D 1/00    (2024.01)

(52) U.S. Cl.
CPC ....... G05B 19/41895 (2013.01); G05D 1/021 (2013.01); *G05B 2219/50393* (2013.01)

(58) Field of Classification Search
CPC .... G05B 19/41895; G05B 2219/50393; G05B 15/02; G05B 19/00; G05B 19/045;
(Continued)

(56) References Cited

U.S. PATENT DOCUMENTS 3,872,686 A * 3/1975 Patrie ...................... F25D 19/00
62/448
5,179,843 A * 1/1993 Cohausz ................. F25D 25/00
62/239

(Continued)

FOREIGN PATENT DOCUMENTS

CN    106846109    6/2017
CN    108197827    6/2018
(Continued)

OTHER PUBLICATIONS

International Preliminary Report on Patentability dated Jul. 5, 2022.
(Continued)

*Primary Examiner* — Michael Collins
(74) *Attorney, Agent, or Firm* — Westbridge IP LLC (57) ABSTRACT

The present application belongs to the technical field of smart appliances, and relates to a delivery control method, which comprises the steps of: transferring goods to a delivery device according to the number of personnel; and controlling the delivery device to move to a set target position. By adopting the method, the corresponding quantity of goods can be configured based on the number of personnel, and moved to the target position by the delivery device, so that the required quantity of goods can be distributed to the target position without requiring a user to give control instructions, thereby providing convenience for (Continued)

the user; meanwhile, the required quantity can be distributed at a time, thereby improving the distribution efficiency and improving the user experience. The present application further discloses a delivery control device and a delivery device.

8 Claims, 7 Drawing Sheets

(58) Field of Classification Search
CPC .. G05B 19/4189; G05D 1/021; G05D 1/0246; G05D 1/0242; G05D 1/0223; G05D 1/0255; G05D 1/0257; G06Q 10/08
See application file for complete search history.

(56) References Cited

U.S. PATENT DOCUMENTS

| | | | | |
|---|---|---|---|---|
| 6,982,640 | B2* | 1/2006 | Lindsay | G06K 19/0717 340/572.1 |
| 7,894,939 | B2* | 2/2011 | Zini | G05D 1/028 700/245 |
| 9,008,827 | B1* | 4/2015 | Dwarakanath | F25B 27/00 700/214 |
| 10,317,119 | B2* | 6/2019 | Zou | F25B 49/00 |
| 10,577,199 | B2* | 3/2020 | Lee | F25D 11/00 |
| 11,001,446 | B2* | 5/2021 | Cantor | G05B 19/41895 |
| 11,132,860 | B1* | 9/2021 | Lecocke | G06Q 10/083 |
| 11,267,650 | B2* | 3/2022 | Godwin | B60P 1/6481 |
| 11,842,414 | B2* | 12/2023 | Faigin | G06Q 30/0261 |
| 2004/0019406 | A1* | 1/2004 | Wang | H04N 7/185 700/231 |
| 2006/0089867 | A1* | 4/2006 | Sakuma | G06Q 10/087 705/28 |
| 2017/0032092 | A1* | 2/2017 | Mink | G06Q 10/1095 |
| 2017/0124547 | A1* | 5/2017 | Natarajan | G06Q 20/202 |
| 2020/0385207 | A1* | 12/2020 | Godwin | B60P 3/007 |
| 2021/0276597 | A1* | 9/2021 | Yu | B60W 60/00256 |
| 2021/0395009 | A1* | 12/2021 | Su | G07F 11/16 |
| 2022/0219900 | A1* | 7/2022 | Eidsmore | B60P 1/4421 |

FOREIGN PATENT DOCUMENTS

| | | |
|---|---|---|
| CN | 108427318 | 8/2018 |
| CN | 110084557 | 8/2019 |
| JP | 2019-149002 | 9/2019 |

OTHER PUBLICATIONS

International Search Report from PCT/CN2020/126876 dated Feb. 5, 2021.

* cited by examiner

DELIVERY CONTROL METHOD, DELIVERY CONTROL DEVICE AND DELIVERY DEVICE

CROSS-REFERENCE TO RELATED APPLICATIONS

The present application is the national stage entry of PCT/CN2020/126876, filed on Nov. 5, 2020, which was filed based on Chinese Patent Application No. 201911410507.3 with filing date of Dec. 31, 2019, and claims priority to this Chinese Patent Application. The entire contents of both Applications are incorporated into the present application herein by reference.

TECHNICAL FIELD

The present application relates to the technical field of smart appliances, for example, relates to a delivery control method, a delivery control device and a delivery device.

BACKGROUND

With the rapid development of Internet of Things (IOT) technology, smart home has become an important part of home informatization and social informatization. An increasing number of traditional home appliances join the ranks of smart homes; and the appliance control, the intelligent scenes of home appliances and the like are realized through IOT. At present, with the widespread use of smart appliances, people have increasingly intelligent requirements on the functions of smart appliances; and refrigerators or delivery devices capable of moving automatically also appear.

During implementation of embodiments of the present disclosure, it is found that the related technologies at least have the following problems: at present, the smart appliances controlled by voice or instructions sent by a user terminal to move is present; however, the users must control the smart appliances actively; the movable delivery device can only deliver the goods pre-placed in the delivery devices to the users; and the corresponding number of goods cannot be configured according to the number of users, so that the users have relatively poor experience for the existing home appliances.

SUMMARY

To basically understand some aspects of the disclosed embodiments, a brief summary is given below. The summary is not a general comment, nor an intention to determine key/important elements or describe the protection scope of the embodiments, but serves as a preface to the following detailed description.

The embodiments of the present disclosure provide a delivery control method, a delivery control device and a delivery device, to solve the technical problem of how to configure and distribute different quantities of goods without requiring a user to give control instructions.

In some embodiments, the delivery control method comprises the steps of:
 transferring goods to a delivery device according to the number of personnel; and
 controlling the delivery device to move to a set target position.

In some embodiments, the delivery control device comprises a processor and a memory storing program instructions; and the processor is configured to execute the delivery control method when executing the program instructions.

In some embodiments, the delivery device comprises the above delivery control device.

The delivery control method, the delivery control device and the delivery device provided by the embodiments of the present disclosure can achieve the following technical effects: the corresponding quantity of goods can be configured based on the number of personnel and moved to the target position by the delivery device; the required quantity of goods can be automatically distributed to the target position without requiring the user to give the control instructions, thereby providing convenience for the user; and meanwhile, the required quantity can be distributed at a time, thereby improving the distribution efficiency and the user experience.

The above general description and the following description are merely exemplary and explanatory, and are not used to limit the present application.

BRIEF DESCRIPTION OF THE DRAWINGS

One or more embodiments are exemplified by the corresponding accompanying drawings; and the exemplified descriptions and the accompanying drawings do not constitute a limitation to the embodiments. Components with the same reference numerals in the accompanying drawings are shown as similar components; and the accompanying drawings do not constitute a proportion limitation. In the drawings.

DETAILED DESCRIPTION

To understand characteristics and technical contents of the embodiments of the present disclosure in more detail, the implementation of the embodiments of the present disclosure will be described in detail with reference to the accompanying drawings. The accompanying drawings are for reference only, and are not used to limit the embodiments of the present disclosure. In the following technical descriptions, for convenience of explanation, multiple details are used to provide a sufficient understanding of the disclosed embodiments. However, one or more embodiments can still be implemented without these details. In other cases, the display of well-known structures and devices can be simplified, to simplify the accompany drawings.

The terms "first" and "second" in the description, claims and the accompanying drawings of the embodiments of the present disclosure are used to distinguish similar objects, rather than describe a specific order or sequence. It should be understood that the data used in this way can be interchanged under appropriate circumstances to facilitate the embodiments of the disclosed embodiments described herein. In addition, the terms "comprise", "have" and any variations thereof are intended to cover non-exclusive inclusion.

Unless otherwise specified, the term "multiple" means two or more.

In the embodiments of the present disclosure, the character "I" indicates that a front object and a rear object are in an "or" relationship. For example, AB means A or B.

The term "and/or" refers to an association relationship of the described objects, and indicates the existence of three possible relationships. For example, A and/or B means three relationships: A or B, or A and B.

Figure 1:
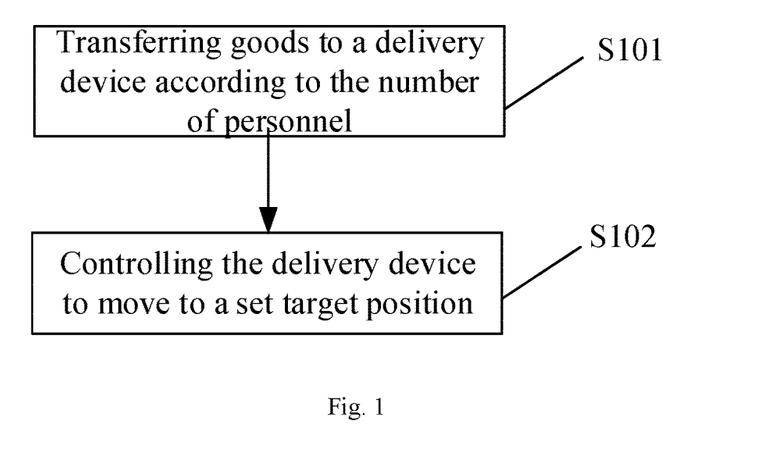
FIG. 1 is a flowchart of a delivery control method provided by an embodiment of the present disclosure.

As shown in FIG. 1, the embodiments of the present disclosure provide a delivery control method, comprising the following steps:
 S101. transferring goods to a delivery device according to the number of personnel; and
 S102. controlling the delivery device to move to a set target position.

By adopting the delivery control method provided by the embodiments of the present disclosure, the corresponding quantity of goods can be configured based on the number of personnel, and can be moved to the target position by the delivery device, so that the required quantity of goods can be automatically distributed to the target position, thereby providing convenience for a user; and meanwhile, the required quantity can be distributed at a time, thereby improving the distribution efficiency.

Optionally, the step of transferring the goods to the delivery device according to the number of personnel comprises the sub-steps of controlling a shipment device to move the goods to a transmission device according to the number of personnel, and controlling the transmission device to move the goods to the delivery device.

Optionally, the step of controlling the shipment device to move the goods to the transmission device according to the number of personnel comprises the sub-step of configuring the corresponding quantity of goods according to the number of personnel so that the quantity of goods transferred to the delivery device is the same as the number of personnel. Optionally, the target position is detected by a human body detection device, such as a camera or an infrared sensor; a human face is recognized by the camera or detected by the infrared sensor; when three people are detected at the target position, three shipment devices are controlled to move three goods, such as three bottles of mineral water, to the delivery device. In this way, the required quantity of the user can be automatically identified according to the number of personnel; and the accuracy of obtaining the required quantity is improved.

Optionally, the method further comprises a step of controlling the delivery device to be closed before controlling the delivery device to move to the target position.

Optionally, the step of controlling the delivery device to be closed comprises a sub-step of controlling the delivery device to be closed when the quantity of goods transferred to the delivery device is the same as the number of personnel. Optionally, if the number of personnel is three, and the quantity of goods transferred to the delivery device is also three bottles of mineral water, the delivery device is closed and controlled to move to the target position. In this way, the distribution efficiency can be improved.

Optionally, the delivery control method also comprises the steps of: controlling the delivery device to be opened after the delivery device reaches the target position, thereby facilitating the user to take out the goods; and controlling the delivery device to be closed and returned to an initial position when satisfying conditions.

Optionally, satisfying conditions comprises that the goods leaving the delivery device is detected, and/or the delivery device is opened for a set time.

Optionally, the delivery device is controlled to be closed and returned to the initial position after the delivery device reaches the target position and the goods leaving the delivery device is detected. Optionally, the delivery device is controlled to be closed after the set time and returned to the initial position after the delivery device reaches the target position, so that the power consumption of the delivery device can be saved.

Optionally, the step of controlling the delivery device to be closed comprises a step of closing the delivery device by controlling a warehouse of the delivery device to fall. Optionally, the delivery device is opened by controlling the warehouse of the delivery device to rise.

Optionally, a pressure sensor is arranged in the warehouse of the delivery device. When the pressure value increases, it is determined that the goods are received; when the pressure value decreases, it is determined that the goods are taken away; and the quantity of goods received or taken away is determined by the change of the pressure value detected by the pressure sensor. Optionally, different goods have different weights and different corresponding pressure values. For example, a pressure value range of 4 N to 6 N is set as one bottle of water; a pressure value range of 9 N to 11 N is set as two bottles of water; a pressure value range of 14 N to 16 N is set as three bottles of water; and a pressure value range of 0.4 N to 0.6 N is set as one loaf of bread. When the pressure sensor detects that the pressure value of the warehouse increases by 15 N, it is determined that three bottles of water are received by the warehouse; and when the pressure sensor detects that the pressure value of the warehouse decreases by 15 N, it is determined that three bottles of water in the warehouse are taken away. In this way, the accuracy of obtaining the quantity of goods in and out of the warehouse can be improved.

Optionally, the target position is a set coordinate value, such as a coordinate value of the position 1 m near the dining table, a coordinate value of the position 0.5 m near the sofa, or a coordinate value of the position 0.5 m near the bed.

By adopting the delivery control method provided by the embodiments of the present disclosure, the corresponding quantity of goods can be configured based on the number of personnel, and moved to the target position by the delivery device, so that the required quantity of goods can be automatically distributed to the target position without requiring the user to give the control instructions, thereby providing convenience for the user; and meanwhile, the required quantity is distributed at a time, thereby improving the distribution efficiency and the user experience.

Figure 2:
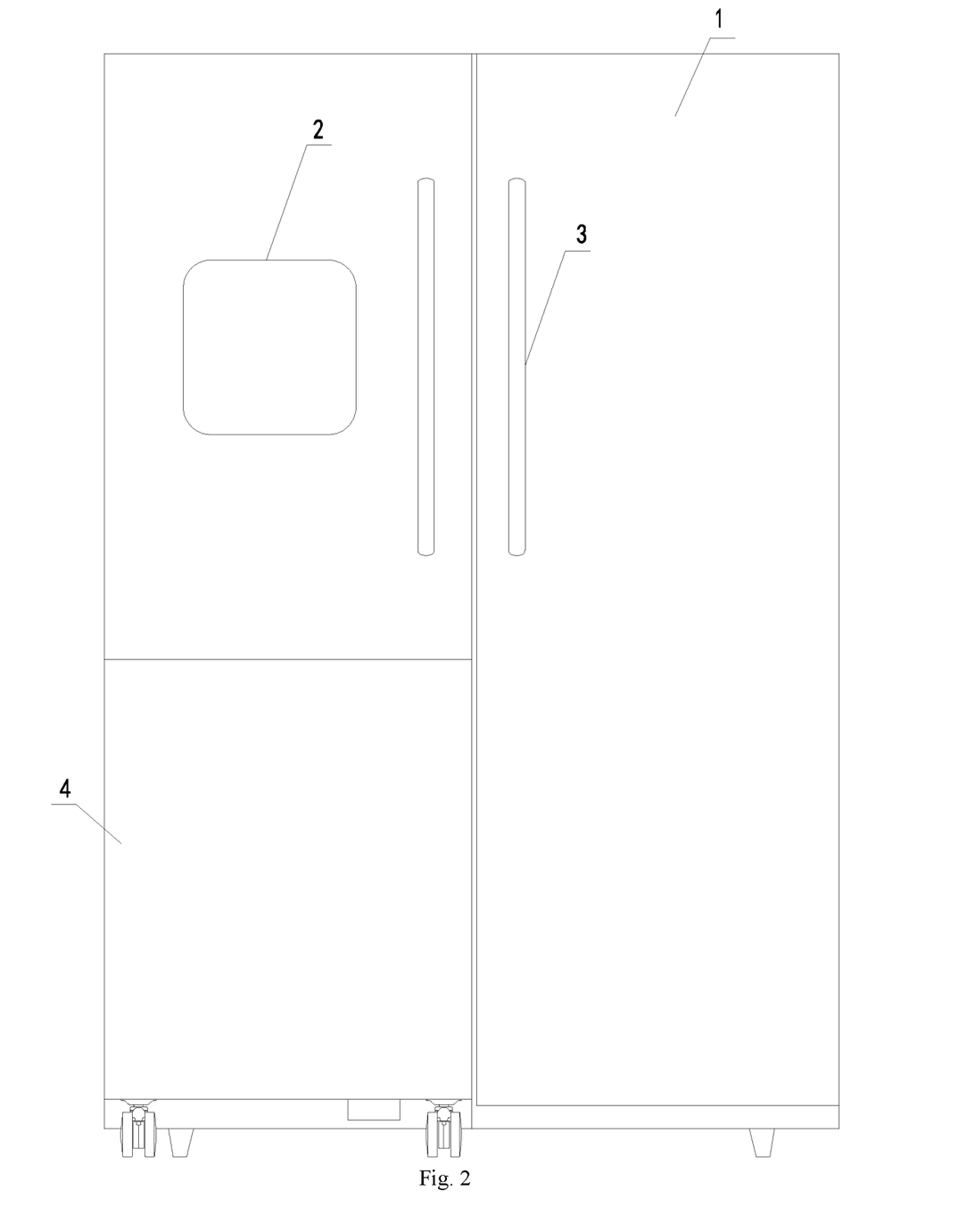
FIG. 2 is a schematic diagram of the cooperation between a refrigerator and a delivery device provided by a disclosed embodiment.

In actual application, the delivery device is arranged at the bottom of a refrigerator. FIG. 2 is a schematic diagram of the cooperation between the refrigerator and the delivery device, and comprises the delivery device 4, a refrigerator 1, a refrigerator display 2, and a refrigerator handle 3.

Figure 3:
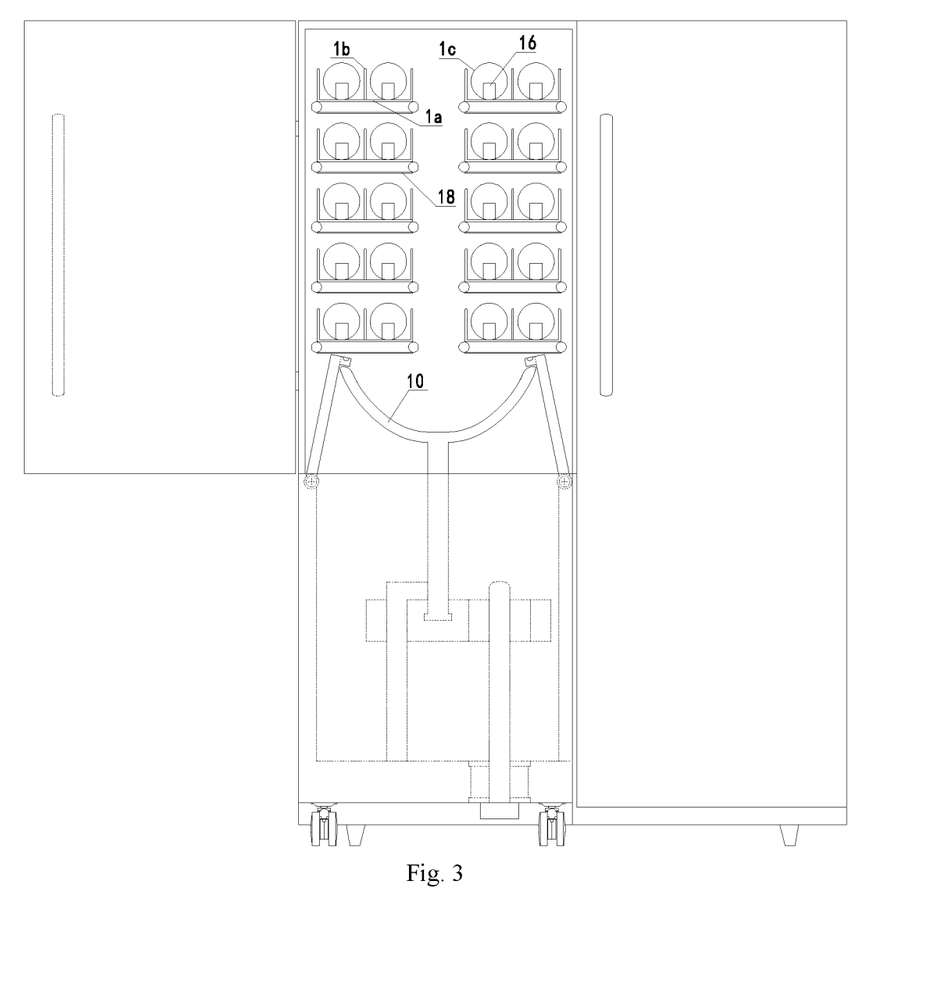
FIG. 3 is a front schematic view of the cooperation between a refrigerator and a delivery device in a door-opening state provided by a disclosed embodiment.

As shown in FIG. 3, which is a schematic front view of the cooperation between the refrigerator and the delivery device, multiple shipment devices are arranged inside the refrigerator 1; and each shipment device comprises a first motor 16, a supporting plate 1a, a partition plate 1b, and a helical spring 1c. The plurality of shipment devices are divided into two groups, which are respectively fixed in the refrigerator in parallel at intervals from the bottom up; a shipment channel is reserved between the two groups of shipment devices; and each partition plate 1b is arranged on the supporting plate 1a to form a goods channel. Goods are classified and placed on the goods channels; the helical springs 1c are arranged on the goods channels; each goods channel is correspondingly provided with one helical spring 1c; and pitches of the helical springs 1c are used for accommodating the goods.

Figure 4:
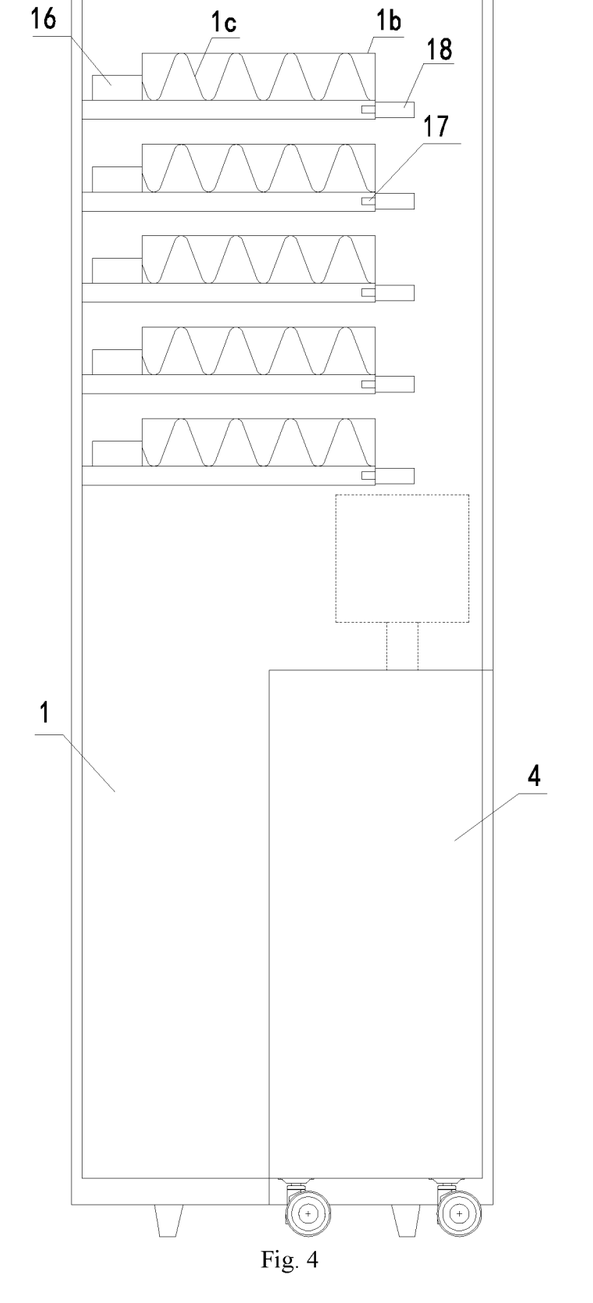
FIG. 4 is a side view of the cooperation between a refrigerator and a delivery device provided by a disclosed embodiment.

As shown in FIG. 4, which is a side view of the cooperation between the refrigerator and the delivery device, the shipment devices comprise the first motors 16; multiple transmission devices are further arranged inside the refrigerators; and each transmission device comprises a second motor 17 and a transmission belt. Each first motor 16 drives the corresponding helical spring 1c to rotate and pushes the goods to move away from the first motor 16, so that the goods on the goods channel fall onto the transmission belt 18 of the corresponding transmission device. The second motor 17 drives the corresponding transmission belt 18 to rotate, and drives the corresponding transmission belt 18 to convey the goods to the shipment channel between the two groups of shipment devices, so that the goods fall into the risen warehouse 10 of the delivery device 4.

Figure 5:
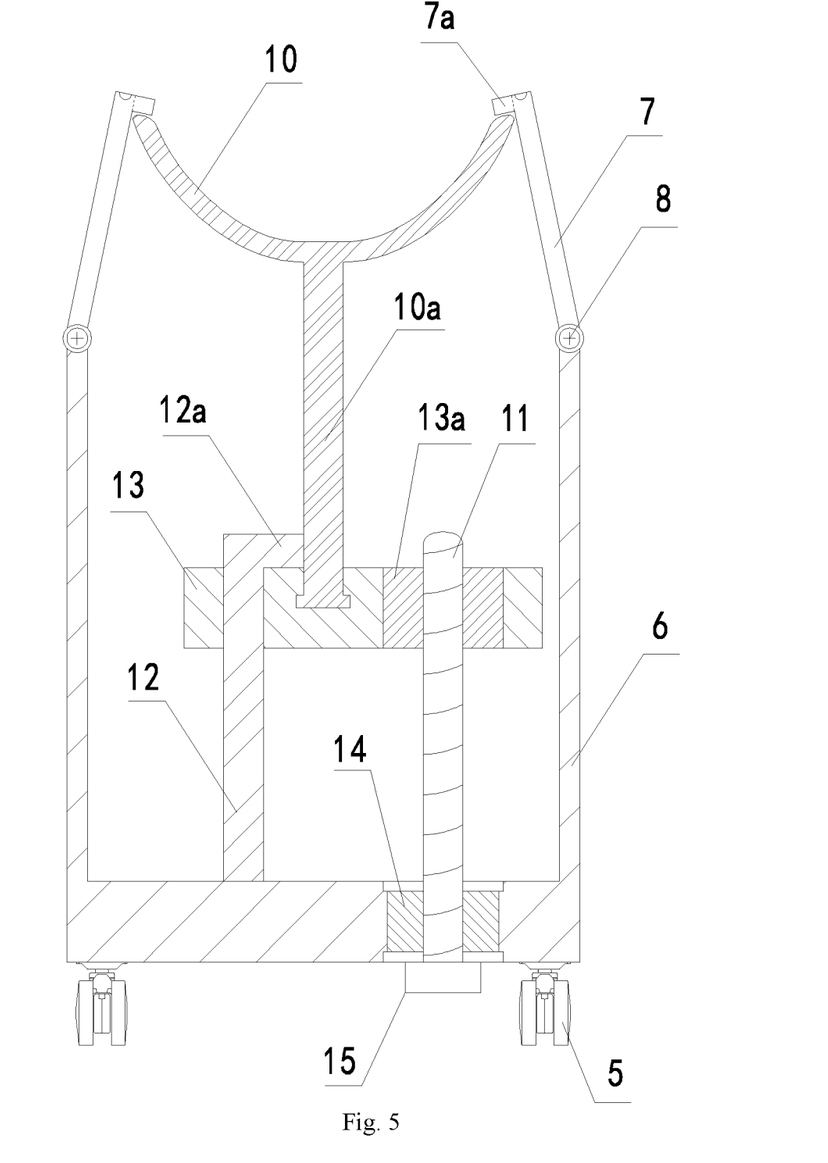
FIG. 5 is a sectional schematic diagram of an opened state of a box cover of a delivery device provided by a disclosed embodiment.

As shown in FIG. 5, which is a sectional schematic diagram of an opened state of a box cover of the delivery device, the delivery device 4 comprises running driving wheels 5, a box body 6 and a box cover 7; the running driving wheels 5 are arranged on a lower surface of the bottom of the box body 6; and each running driving wheel 5 is driven by a motor. The box cover 7 is rotationally connected with the box body 6 through a rotating shaft 8, and is in a double-door form; and a first limiting clamp 7a is arranged on the box cover 7 for limiting a rising height of the warehouse 10. A lifting device is arranged inside the box body 6, and comprises a screw rod 11, a fixed rod 12 and a movable frame 13; one end of the screw rod 11 is fixed at the bottom of the box body 6 through a bearing 14; a stepping motor 15 drives the screw rod 11 to rotate; and the screw rod 11 penetrates through the movable frame 13 through a nut 13a. The fixed rod 12 penetrates through the movable frame 13; one end of the fixed rod 12 is fixedly connected with the bottom of the box body 6; and the other end of the fixed rod is provided with a second limiting clamp 12a for limiting the rising height of the movable frame 13. One end of a warehouse rod 10a is fixedly connected with the warehouse 10; and the other end is fixed on the movable frame 13.

Figure 6:
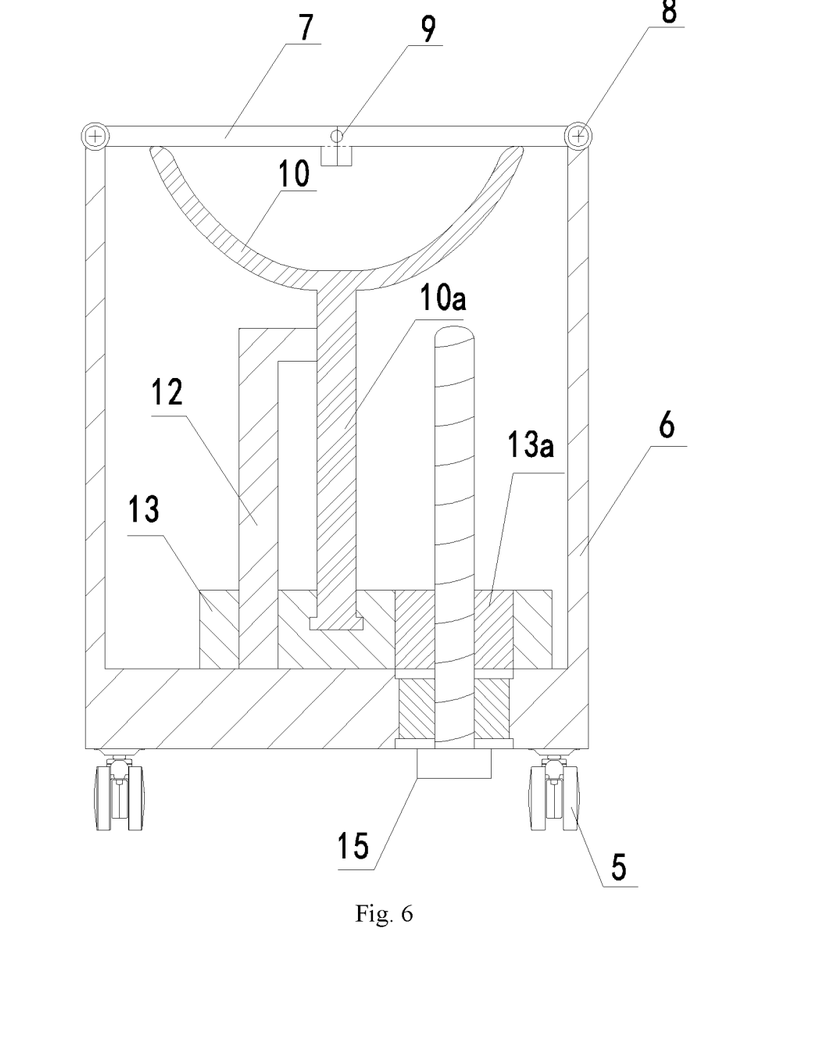
FIG. 6 is a sectional schematic diagram of a closed state of a box cover of a delivery device provided by a disclosed embodiment.

As shown in FIG. 6, which is a sectional schematic diagram of a closed state of the box cover of the delivery device, an electronic lock 9 is arranged on the box cover 7; the top of the warehouse 10 is lowered to within the box body 6; and the box cover 7 is locked by the electronic lock 9 when the box cover is closed.

Optionally, if it is detected that the number of personnel is three, the first motors 16 corresponding to the three shipment devices are controlled to drive the corresponding helical springs 1c to rotate and push the goods, such as three bottles of mineral water, at the same time to move to the corresponding transmission belts 18. Meanwhile, the electronic lock 9 is unlocked, and the stepping motor 15 reverses to drive the movable frame 13 and the warehouse rod 10a to move upwards, thereby driving the warehouse 10 to rise. When the movable frame 13 is risen to the second limiting clamp 12a on the fixed rod 12, the top of the warehouse 10 abuts against the first limiting clamp 7a of the box cover 7; the stepping motor 15 stops reversing; and the warehouse 10 stops rising. When three bottles of mineral water fall onto the corresponding transmission belt 18, the corresponding second motor 17 drives the transmission belt 18 to rotate, so that the three bottles of mineral water are conveyed to the shipment channel between the two groups of shipment devices; and the mineral water falls from the shipment channel into the warehouse 10 risen by the delivery device 4. When the warehouse detects that the pressure value reaches the range of 14N to 16N through the pressure sensor, it is determined that the three bottles of mineral water have been received.

Optionally, based on multiple tests, the time spent in the process of rising the warehouse is 2 s; and the time spent in conveying the goods to the warehouse once is 5 s.

Optionally, after the warehouse 10 receives the three bottles of mineral water, the stepping motor 15 is controlled to drive the movable frame 13 and the warehouse rod 10a to move to lower the warehouse 10. When the movable frame 13 is lowered to the bottom of the box body 6, the stepping motor 15 stops running; the warehouse 10 falls to within the box body 6 at this moment; and the box cover 7 is closed and locked by the electronic lock 9, so that and the delivery device is closed.

Optionally, after the delivery device 4 receives three bottles of mineral water and is closed, the delivery device is controlled to move to a set target position, such as a sofa. When the delivery device 4 reaches the target position, the electronic lock 9 is unlocked, and the stepping motor 15 reverses to drive the movable frame 13 and the warehouse rod 10a, so that the warehouse 10 is risen. When the movable frame 13 is risen to the second limiting clamp 12a on the fixed rod 12, the top of the warehouse 10 abuts against the first limiting clamp 7a on the box cover 7, so that the warehouse 10 stops rising and displays the three bottles of mineral water in front of the user. When the pressure sensor of the warehouse detects the pressure value reduced by 14N to 16N, it is considered that three bottles of mineral water have been taken away. Alternatively, after a set time, for example, 10 min, the stepping motor 15 is controlled to drive the movable frame 13 and the warehouse rod 10a to move, so that the warehouse 10 is lowered. When the movable frame 13 is lowered to the bottom of the box body 6, the warehouse 10 is lowered to within the box body 6; the stepping motor 15 stops running; and the box cover 7 is closed and locked by the electronic lock 9, so that the delivery device is closed. Then, the delivery device is controlled to return to an initial position, i.e., the bottom of the refrigerator. In this way, the refrigerator can distribute the matched quantity of bottled water and other goods according to the number of personnel; and the goods can be delivered to the set target position by the delivery device, so that the goods can be delivered to the user without requiring the user to give the control instructions; the quantity required by the user can be delivered at a time, thereby improving the distribution efficiency; and the functions of the refrigerator are increased, to make the refrigerator smarter and improve the user experience.

Optionally, a photoelectric switch is arranged in the warehouse 10; and whether the goods are received or taken away in the warehouse is detected by the photoelectric switch.

Optionally, when a distance between the delivery device and the target position is less than or equal to a first set threshold value in the process of moving the delivery device to the target position, the delivery device is controlled to stop moving. Optionally, the first set threshold value is 0.5 m.

Optionally, the delivery device is powered by a storage battery.

Optionally, the delivery device is provided with the running driving wheels and the driving motor, which enable the delivery device to move on the plane. Cameras are further arranged at a front end and a side surface of the delivery device, for acquiring information of road surface in real time by collecting and recognizing patterns. In case of obstacles such as steps, the controller controls the delivery device to turn or stop running, thereby preventing collision or falling. Meanwhile, a radar ultrasonic sensor is provided for detecting a distance between the delivery device and the surrounding objects during movement. Photoelectric coding discs are arranged on the running driving wheels of the delivery device, and can be adopted to detect and control the wheel speed, thereby realizing positioning and path planning.

Optionally, a human face is recognized by the cameras or detected by the infrared sensor; when three people are detected at the target position, three shipment devices of the refrigerator are controlled to move the corresponding goods, such as three bottles of mineral water, to the delivery device through the transmission device; and then, the delivery device is controlled to deliver the three bottles of mineral water to the target position, such as a dining table. When the delivery device reaches the dining table, the delivery device is opened, so that every user can get the mineral water conveniently and quickly. In this way, the goods required by the user can be distributed to the user at a time, thereby providing convenience for the user, improving the distribution efficiency, and also making the refrigerator smarter.

Optionally, after the user takes out three bottles of mineral water from the delivery device, or after a set time, for example, 10 min, the delivery device is closed and returned to the initial position, i.e., the bottom of the refrigerator. In this way, the defect that the delivery device is in the delivery state for a long time to cause over-quick power consumption, can be avoided; and the delivery device can be returned to the initial position in time, thereby saving the power consumption.

Figure 7:
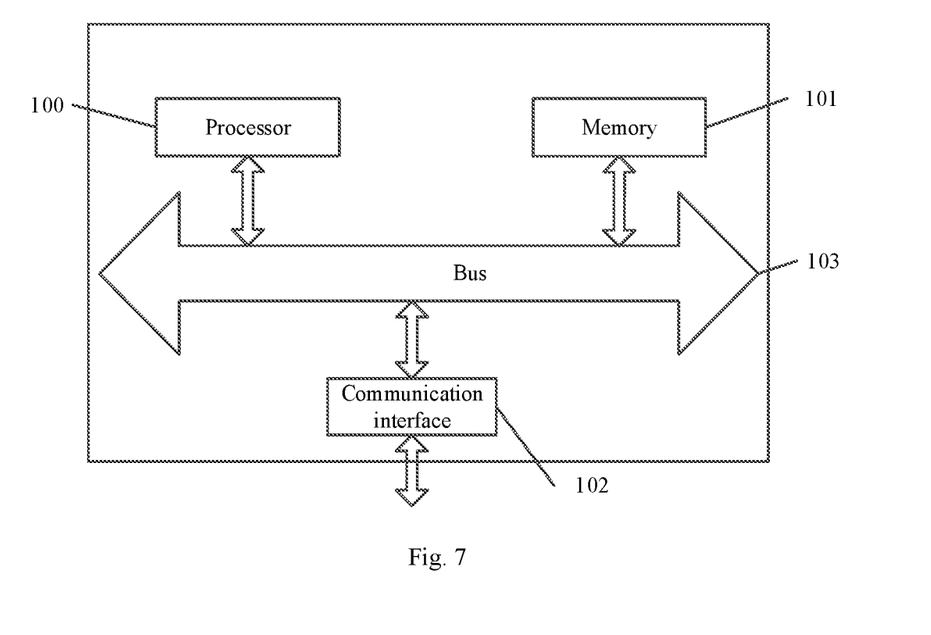
FIG. 7 is a structural schematic diagram of a delivery control device provided by an embodiment of the present disclosure.

Embodiments of the present disclosure provide a delivery control device, which has a structure as shown in FIG. 7, comprises a processor 100 and a memory 101 storing program instructions, and may further comprise a communication interface 102 and a bus 103. The processor 100, the communication interface 102, and the memory 101 can communicate with each other through a bus 103. The communication interface 102 can be used for information transmission. The processor 100 can call program instructions in the memory 101, and is configured to execute the delivery control method in the above embodiments when executing the program instructions.

In addition, the program instructions in the above memory 101 can be realized in the form of software function units and can be stored in a computer-readable memory medium when the program instructions are sold or used as independent products.

As a computer-readable memory medium, the memory 101 can be used to store software programs and computer-executable programs, such as program instructions/modules corresponding to the method in the embodiment of the present disclosure. The processor 100 executes function applications and data processing by operating the software programs, instructions and modules stored in the memory 101, thereby realizing the delivery control method in the above method embodiments.

The memory 101 may comprise a memory program area and a memory data area, in which the memory program area may store application programs required by an operating system and at least one function; and the memory data area may store data created according to the use of a mobile terminal and the like. In addition, the memory 101 may comprise a high-speed random access memory (RAM), and may further comprise a nonvolatile memory.

According to the delivery control device in the above embodiments, the delivery control device provided by the embodiments of the present disclosure can recognize human faces by the cameras to obtain the number of human faces, thereby determining the number of personnel, or can determine the number of personnel by the infrared sensors and then determine the quantity of drinks or foods according to the number of personnel, so that the corresponding quantity of drinks or foods can be configured and delivered to the set target position by the delivery device, thereby providing convenience for the user; and meanwhile, the required quantity can be distributed at a time, thereby improving the distribution efficiency and improving the user experience.

The embodiments of the present disclosure provide a delivery device, which comprises the delivery control device. The delivery device can recognize human faces by the cameras to obtain the number of human faces, thereby determining the number of personnel, or can determine the number of personnel by the infrared sensors and then determine the quantity of drinks or foods according to the number of personnel, so that the corresponding quantity of drinks or foods can be configured and delivered to the set target position by the delivery device, thereby providing convenience for the user; and meanwhile, the required quantity can be distributed at a time, thereby improving the distribution efficiency and improving the user experience.

The embodiments of the present disclosure provide a computer-readable memory medium, storing computer executable instructions which are configured to execute the above delivery control method.

The embodiments of the present disclosure provide a computer program product, comprising a computer program stored on a computer-readable memory medium, in which the computer program comprises program instructions; and when the program instructions are executed by a computer, the computer is enabled to execute the above delivery control method.

The above computer-readable memory medium may be a transient computer-readable memory medium or a non-transient computer-readable memory medium.

Technical solutions of the embodiments of the present disclosure can be reflected in the form of software product. The computer software product is stored in a memory medium, and comprises one or more instructions for making computer equipment (which may be a personal computer, a server, network equipment, or the like) execute all or part of the steps of the method provided by the embodiments of the present disclosure. The foregoing memory may be a non-transient memory medium, comprising a USB flash drive, a mobile hard disk, a read-only memory (ROM), a random access memory (RAM), a diskette, a compact disk (CD) and the like, and may also be a transient memory medium.

The above descriptions and accompanying drawings fully illustrate the embodiments of the present disclosure, so that those skilled in the art can practice them. Other embodiments may comprise structural, logical, electrical, procedural, and other changes. The embodiments only represent possible variations. Unless explicitly required, individual components and functions are optional; and the order of operations is variable. Parts and features of some embodiments may be included in or substituted with parts and features of other embodiments. The scope of the embodiments of the present disclosure comprises the entire scope of claims, and all available equivalents of the claims. When used in the present application, the terms "first", "second" and the like may be used in the present application to describe various components, but the components should not be limited by the terms. The terms are merely used to distinguish one component from another. For example, the first component can be called the second component without changing the meaning of the description. Similarly, the second component can be called the first component as long as all present "first components" are renamed uniformly while all present "second components" are renamed uniformly. The first component and the second component are both components, but may not be the same component. In addition, the words used in the present application are merely used to describe the embodiments, rather than limit the claims. As used in the descriptions of the embodiments and the claims, unless the context clearly indicates, the singular forms "a", "an" and "the" are intended to comprise the plural forms as well. Similarly, the term "and/or" as used in the present application is meant to comprise any and all possible combinations of one or more associated listings. Furthermore, when used in the present application, the term "comprise" and its variants "comprise" and/or "comprising" and the like refer to the existence of stated features, integers, steps, operations, elements, and/or components, but do not exclude the existence or addition of one or more other features, integers, steps, operations, elements, components, and/or groups of them. Without further restrictions, the element defined by the statement "comprising one . . . " does not exclude the existence of other identical elements in the process, method or equipment comprising the element. Each embodiment herein may focus on the differences from other embodiments, while the identical or similar parts of the various embodiments can be referred to each other. If the methods, the products and the like disclosed in the embodiments correspond to the method parts disclosed in the embodiments, the related parts can be referred to the description of the method parts.

Those skilled in the art can realize that units and algorithm steps of each example described in combination with the embodiments disclosed herein can be implemented by electronic hardware or a combination of computer software and the electronic hardware. Whether the functions are implemented by hardware or software may depend on the specific application and design constraints of the technical solution. The technical personnel can implement the described functions by using different methods for each specific application, but such implementation should not be considered beyond the scope of the embodiments of the present disclosure. The technical personnel can clearly understand that, for the convenience and conciseness of description, the specific working processes of the systems, the devices and the units described above can refer to the corresponding processes in the foregoing method embodiments, and will not be repeated here.

In the embodiments disclosed herein, the disclosed methods and products (comprising but not limited to the devices, the equipment and the like) can be implemented in other ways. For example, the device embodiments described above are merely schematic. For example, the division of units may only be a logical function division, and may adopt another division ways in actual implementation, for example, multiple units or components can be combined or integrated into another system, or some features can be ignored or not implemented. In addition, the shown or discussed mutual coupling, direct coupling or communication connection may be indirect coupling or communication connection through some interfaces, devices or units or in electrical, mechanical or other forms. The units described as separate components may or may not be physically separated; and the components displayed as units may or may not be physical units, i.e., may be located at one place or distributed to multiple network units. Some or all of the units can be selected according to actual needs to implement the present embodiment. Furthermore, each functional unit in the embodiments of the present disclosure may be integrated into one processing unit; alternatively, each unit may physically exist separately; and alternatively, two or more units may be integrated into one unit.

The flowcharts and the block diagrams in the accompanying drawings show achievable architectures, functions and operations of the systems, the methods and the computer program products according to the embodiments of the present disclosure. In this regard, each block in the flowcharts or the block diagrams may represent a part of a module, a program segment or a code; and the part of the module, the program segment or the code comprises one or more executable instructions for implementing specified logical functions. In some alternative implementations, the functions noted in the blocks may also be implemented in a sequence different from that noted in the accompanying drawings. For example, two consecutive blocks can actually be executed substantially in parallel, and sometimes can be executed in a reverse sequence, depending on the functions involved. In the descriptions corresponding to the flowcharts and the block diagrams in the accompanying drawings, the operations or steps corresponding to different blocks may also be implemented in a sequence different from that disclosed in the descriptions; and sometimes, no specific sequence exists between different operations or steps. For example, two consecutive operations or steps can actually be executed substantially in parallel, and sometimes can be executed in a reverse sequence, depending on the functions involved. Each block in the block diagrams and/or flowcharts, and combinations of blocks in the block diagrams and/or flowcharts, may be implemented by hardware-based systems special for performing specified functions or actions, or may be implemented by a combination of special hardware and computer instructions.

What is claimed is:

1. A delivery control method, for a delivery device movably arranged at the bottom of a refrigerator;
   wherein the delivery device comprises running driving wheels, a box body, a box cover, and a warehouse, the running driving wheels are arranged on a lower surface of a bottom of the box body, and the box cover is rotationally connected with the box body through a rotating shaft;
   wherein a lifting device is arranged inside the box body and comprises a screw rod, a fixed rod, a movable frame, a stepping motor, and a warehouse rod;
   wherein one end of the screw rod is fixed at the bottom of the box body through a bearing, the stepping motor drives the screw rod to rotate, and the screw rod penetrates through the movable frame through a nut, the fixed rod penetrates through the movable frame; one end of the fixed rod is fixedly connected with the bottom of the box body; and the other end of the fixed rod is provided with a second limiting clamp for limiting a rising height of the movable frame, one end of the warehouse rod is fixedly connected with the warehouse, and the other end of the warehouse rod is fixed on the movable frame;

the method comprising:

transferring goods to the risen warehouse of the delivery device according to a number of personnel; and controlling the delivery device to be closed, comprising:

controlling the stepping motor to drive the movable frame and the warehouse rod to move to lower the warehouse;

when the movable frame is lowered to the bottom of the box body, stopping the stepping motor, so that the warehouse falls to within the box body; and closing and locking, the box cover is closed and locked; and controlling the running driving wheels of the delivery device to move to a set target position.

2. The method of claim 1, wherein the step of transferring the goods to the delivery device according to the number of personnel comprises:

controlling the delivery device to a transmission device according to the number of personnel, and controlling the transmission device to move the goods to the delivery device.

3. The method of claim 2, wherein the step of controlling the delivery device to move the goods to the transmission device according to the number of personnel comprises:

configuring the corresponding quantity of goods according to the number of personnel so that the quantity of goods transferred to the delivery device is the same as the number of personnel.

4. The method of claim 1, further comprising:

controlling the box cover of the delivery device to be opened after the delivery device reaches the target position, and controlling the box cover of the delivery device to be closed and returned to an initial position when satisfying conditions.

5. The method of claim 4, wherein the satisfying conditions comprises at least one of:

the goods leaving the delivery device is detected; and the box cover of the delivery device is opened for a set time.

6. A delivery control device, comprising a processor and a memory storing program instructions, wherein the processor is configured to execute the delivery control method of claim 1 when executing the program instructions.

7. A delivery control device, comprising a processor and a memory storing program instructions, wherein the processor is configured to execute the delivery control method of claim 4 when executing the program instructions.

8. A delivery control device, comprising a processor and a memory storing program instructions, wherein the processor is configured to execute the delivery control method of claim 5 when executing the program instructions.

* * * * *